United States Patent
Li et al.

(10) Patent No.: US 12,344,121 B2
(45) Date of Patent: Jul. 1, 2025

(54) TRACTION BATTERY CONTROLLER HAVING STATE-OF-CHARGE COMPENSATED ESTIMATOR GAIN CALIBRATION

(71) Applicant: Ford Global Technologies, LLC, Dearborn, MI (US)

(72) Inventors: Yonghua Li, Ann Arbor, MI (US); Kevin Vander Laan, Bloomfield Hills, MI (US); Richard Dyche Anderson, Plymouth, MI (US); Alan Robert Dona, Huntington Woods, MI (US); Matthew Allen Tomai, Livonia, MI (US); Gyouho Cho, Toronto (CA)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 266 days.

(21) Appl. No.: 18/325,781

(22) Filed: May 30, 2023

(65) Prior Publication Data
US 2024/0399923 A1  Dec. 5, 2024

(51) Int. Cl.
*B60L 58/12* (2019.01)
*B60L 58/24* (2019.01)
*H01M 10/48* (2006.01)

(52) U.S. Cl.
CPC .............. *B60L 58/12* (2019.02); *B60L 58/24* (2019.02); *H01M 10/48* (2013.01); *B60L 2240/545* (2013.01); *H01M 2220/20* (2013.01)

(58) Field of Classification Search
CPC .... B60L 58/12; B60L 58/24; B60L 2240/525; H01M 10/48; H01M 2220/20
See application file for complete search history.

(56) References Cited

U.S. PATENT DOCUMENTS

| | | | | |
|---|---|---|---|---|
| 7,498,772 B2 * | 3/2009 | Palladino | ............. | G01R 31/367 320/132 |
| 8,798,831 B2 * | 8/2014 | Cho | ........................ | B60L 58/12 180/65.21 |

(Continued)

FOREIGN PATENT DOCUMENTS

| | | | | |
|---|---|---|---|---|
| CN | 113791360 A | | 12/2021 | |
| KR | 20080000160 A | * | 1/2008 | ........ B60L 2240/545 |
| WO | WO-2018029849 A1 | * | 2/2018 | ............ H01M 10/48 |

OTHER PUBLICATIONS

Translation of KR-20080000160-A, 22 pages (Year: 2008).*

(Continued)

*Primary Examiner* — Dale W Hilgendorf
(74) *Attorney, Agent, or Firm* — David B. Kelley; Brooks Kushman P.C.

(57) ABSTRACT

A traction battery controller of an electrified vehicle dynamically adjusts an estimation gain based on a state-of-charge (SOC) of the traction battery and controls the vehicle according to an operating characteristic of the traction battery estimated from an equivalent circuit model of the traction battery that depends on the estimation gain. The controller may reduce the estimation gain while the SOC is low or high and may otherwise maintain the SOC. The controller may dynamically adjust the estimation gain based further on a temperature of the traction battery. The operating characteristic may be a power capability of the traction battery or an updated SOC of the traction battery.

16 Claims, 5 Drawing Sheets

(56) References Cited

U.S. PATENT DOCUMENTS

| | | | | |
|---|---|---|---|---|
| 8,935,043 B2* | 1/2015 | Li | ............................. | B60L 3/12 |
| | | | | 320/132 |
| 9,440,552 B2* | 9/2016 | Li | ........................... | B60L 58/12 |
| 9,555,718 B2* | 1/2017 | Li | ....................... | H01M 10/482 |
| 10,086,709 B2* | 10/2018 | Roberts | .................... | B60K 6/48 |
| 10,686,321 B2* | 6/2020 | Ravi | ..................... | H01M 10/48 |
| 11,221,370 B2* | 1/2022 | Tohara | .................. | H02J 7/0048 |
| 11,345,254 B2* | 5/2022 | Wang | ..................... | B60L 58/16 |
| 2011/0166732 A1* | 7/2011 | Yu | ......................... | B60W 10/04 |
| | | | | 180/65.265 |
| 2011/0309838 A1* | 12/2011 | Lin | ....................... | H01M 10/48 |
| | | | | 324/427 |
| 2012/0101674 A1* | 4/2012 | Wang | .................. | G01R 31/367 |
| | | | | 903/903 |
| 2012/0179435 A1* | 7/2012 | Song | .................... | G01R 31/367 |
| | | | | 703/2 |
| 2014/0214268 A1* | 7/2014 | Li | ............................. | B60L 3/12 |
| | | | | 701/34.4 |
| 2015/0127280 A1* | 5/2015 | Baba | .................. | G01R 31/3842 |
| | | | | 702/63 |
| 2016/0073205 A1* | 3/2016 | Kill | .......................... | H03G 3/20 |
| | | | | 381/314 |
| 2017/0355276 A1* | 12/2017 | Chang | ..................... | B60L 58/12 |
| 2018/0246173 A1* | 8/2018 | Singh | .................... | G01R 31/392 |
| 2019/0023130 A1* | 1/2019 | Garcha | .................. | B60L 53/14 |
| 2021/0268932 A1* | 9/2021 | Zhang | .................... | B60L 58/13 |
| 2021/0316635 A1* | 10/2021 | Books | ...................... | B60K 6/46 |
| 2022/0305952 A1* | 9/2022 | Klintberg | ................ | B60L 58/10 |
| 2024/0162508 A1* | 5/2024 | Li | ....................... | H01M 10/446 |
| 2024/0174122 A1* | 5/2024 | Li | .......................... | B60L 50/60 |

OTHER PUBLICATIONS

Translation of WO-2018029849-A1, 12 pages (Year: 2018).*
Wilson J. Rugh, et al., Research on gain scheduling, Survey Paper, Department of Electrical and Computer Engineering, Johns Hopkins University, Baltimore, MD, 21218, USA, Department of Mechanical and Aerospace Engineering, UCLA, Los Angeles, CA 90095, USA, received in revised form Dec. 6, 1999.

* cited by examiner

TRACTION BATTERY CONTROLLER HAVING STATE-OF-CHARGE COMPENSATED ESTIMATOR GAIN CALIBRATION

TECHNICAL FIELD

The present disclosure relates to detecting operating characteristics of a traction battery of an electrified vehicle.

BACKGROUND

An electrified vehicle includes a traction battery for providing power to a motor of the vehicle to propel the vehicle. Operating characteristics of the traction battery, such as the power capability of the traction battery and the state-of-charge of the traction battery, may be monitored in controlling the operation of the traction battery and/or the vehicle.

SUMMARY

A vehicle includes a traction battery and a controller. The controller is configured to dynamically adjust an estimation gain based on a state-of-charge (SOC) of the traction battery and to control the vehicle according to an operating characteristic of the traction battery estimated from an equivalent circuit model of the traction battery that depends on the estimation gain.

The controller may reduce the estimation gain when the SOC is less than a low charge threshold and may reduce the estimation gain at an increased rate as the SOC decreases while the SOC is less than the low charge threshold.

The controller may reduce the estimation gain when the SOC is greater than a high charge threshold and may reduce the estimation gain at an increased rate as the SOC increases while the SOC is greater than the high charge threshold.

The controller may reduce the estimation gain when the SOC is either less than a low charge threshold or greater than a high charge threshold and may maintain the estimation gain when the SOC is greater than the low charge threshold and less than the high charge threshold.

The controller may be further configured to dynamically adjust the estimation gain based further on a temperature of the traction battery. The controller may reduce the estimation gain when the temperature is colder than a temperature threshold and may reduce the estimation gain at an increased rate as the temperature decreases while the temperature is colder than the temperature threshold.

The operating characteristic of the traction battery may be a power capability of the traction battery or an updated SOC of the traction battery.

A method for a vehicle having a traction battery includes dynamically adjusting, by a controller, an estimation gain based on a SOC of the traction battery. The method further includes controlling, by the controller, the vehicle according to an operating characteristic of the traction battery estimated from an equivalent circuit model of the traction battery that depends on the estimation gain.

A system for a vehicle having a traction battery includes a controller. The controller is configured to dynamically adjust an estimation gain based on a SOC of the traction battery and to control the vehicle according to an operating characteristic of the traction battery estimated from an equivalent circuit model of the traction battery that depends on the estimation gain.

DETAILED DESCRIPTION

Detailed embodiments of the present disclosure are disclosed herein; however, it is to be understood that the disclosed embodiments are merely exemplary of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
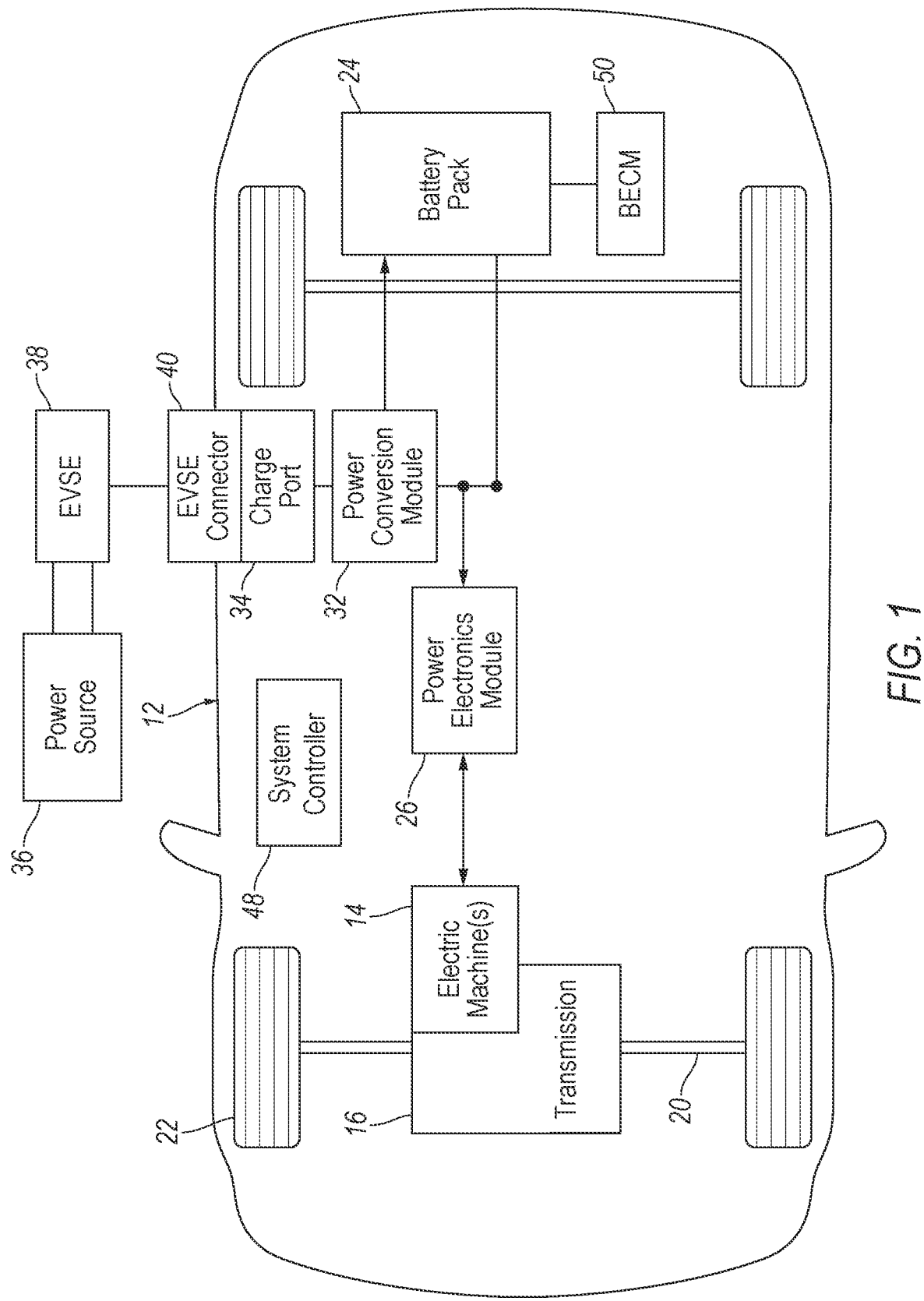
FIG. 1 illustrates a block diagram of a battery electric vehicle (BEV)

Referring now to FIG. 1, a block diagram of an electrified vehicle (EV) 12 in the form of a battery electric vehicle (BEV) is shown. BEV 12 includes a powertrain having one or more traction motors ("electric machine(s)") 14, a traction battery ("battery" or "battery pack") 24, and a power electronics module 26 (e.g., an inverter). In the BEV configuration, traction battery 24 provides all of the propulsion power and the vehicle does not have an engine. In other variations, the EV may be a plug-in (or regular) hybrid electric vehicle (HEV) further having an engine.

Traction motor 14 is part of the powertrain of BEV 12 for powering movement of the BEV. In this regard, traction motor 14 is mechanically connected to a transmission 16 of BEV 12. Transmission 16 is mechanically connected to a drive shaft 20 that is mechanically connected to wheels 22 of BEV 12. Traction motor 14 can provide propulsion capability to BEV 12 and is capable of operating as a generator. Traction motor 14 acting as a generator can recover energy that may normally be lost as heat in a friction braking system of BEV 12.

Traction battery 24 stores electrical energy that can be used by traction motor 14 for propelling BEV 12. Traction battery 24 typically provides a high-voltage (HV) direct current (DC) output. Traction battery 24 is electrically connected to power electronics module 26. Traction motor 14 is also electrically connected to power electronics module 26. Power electronics module 26, such as an inverter, provides the ability to bi-directionally transfer energy between traction battery 24 and traction motor 14. For example, traction battery 24 may provide a DC voltage while traction motor 14 may require a three-phase alternating current (AC) current to function. Inverter 26 may convert the DC voltage to a three-phase AC current to operate traction motor 14. In a regenerative mode, inverter 26 may convert three-phase AC current from traction motor 14 acting as a generator to DC voltage compatible with traction battery 24.

In addition to providing electrical energy for propulsion of BEV 12, traction battery 24 may provide electrical energy for use by other electrical systems of the BEV such as HV loads like electric heater and air-conditioner systems and low-voltage (LV) loads such as an auxiliary battery.

Traction battery 24 is rechargeable by an external power source 36 (e.g., the grid). External power source 36 may be electrically connected to electric vehicle supply equipment (EVSE) 38. EVSE 38 provides circuitry and controls to control and manage the transfer of electrical energy between external power source 36 and BEV 12. External power source 36 may provide DC or AC electric power to EVSE 38. EVSE 38 may have a charge connector 40 for plugging into a charge port 34 of BEV 12.

A power conversion module 32 of EV 12, such as an on-board charger having a DC/DC converter, may condition power supplied from EVSE 38 to provide the proper voltage and current levels to traction battery 24. Power conversion module 32 may interface with EVSE 38 to coordinate the delivery of power to traction battery 24.

The various components described above may have one or more associated controllers to control and monitor the operation of the components. The controllers can be microprocessor-based devices. The controllers may communicate via a serial bus (e.g., Controller Area Network (CAN)) or via discrete conductors.

For example, a system controller 48 ("vehicle controller") is present to coordinate the operation of the various components. Controller 48 includes electronics, software, or both, to perform the necessary control functions for operating BEV 12. Controller 48 may be a combination vehicle system controller and powertrain control module (VSC/PCM). Although controller 48 is shown as a single device, controller 48 may include multiple controllers in the form of multiple hardware devices, or multiple software controllers with one or more hardware devices. In this regard, a reference to a "controller" herein may refer to one or more controllers.

Controller 48 implements a battery energy control module (BECM) 50. BECM 50 is in communication with traction battery 24. BECM 50 is a traction battery controller operable for managing the charging and discharging of traction battery 24 and for monitoring operating characteristics of the traction battery. BECM 50 is operable to implement algorithms to measure (or detect or estimate) the operating characteristics of traction battery 24. BECM 50 controls the operation and performance of traction battery 24 based on the operating characteristics of the traction battery. The operation and performance of other systems and components of BEV 12 may be controlled based on the operating characteristics of traction battery 24.

Operating characteristics of traction battery 24 include the charge capacity and the state-of-charge (SOC) of traction battery 24. The charge capacity of traction battery 24 is indicative of the maximum amount of electrical energy that the traction battery may store. The SOC of traction battery 24 is indicative of a present amount of electrical charge stored in the traction battery. The SOC of traction battery 24 may be represented as a percentage of the maximum amount of electrical charge that may be stored in the traction battery.

Another operating characteristic of traction battery 24 is the power capability of the traction battery. The power capability of traction battery 24 is a measure of the maximum amount of power the traction battery can provide or receive for a specified time period. As such, the power capability of traction battery 24 corresponds to discharge and charge power limits which define the amount of electrical power that may be supplied by or to the traction battery at a given time. These limits can be provided to other vehicle controls, for example, through a vehicle system controller (VSC), so that the information can be used by systems that may draw power from or provide power to traction battery 24. Vehicle controls are to know how much power traction battery 24 can provide (discharge) or take in (charge) in order to meet the driver demand and to optimize the energy usage. As such, knowing the power capability of traction battery 24 allows electrical loads and sources to be managed such that the power requested is within the limits that the traction battery can handle.

Figure 2:
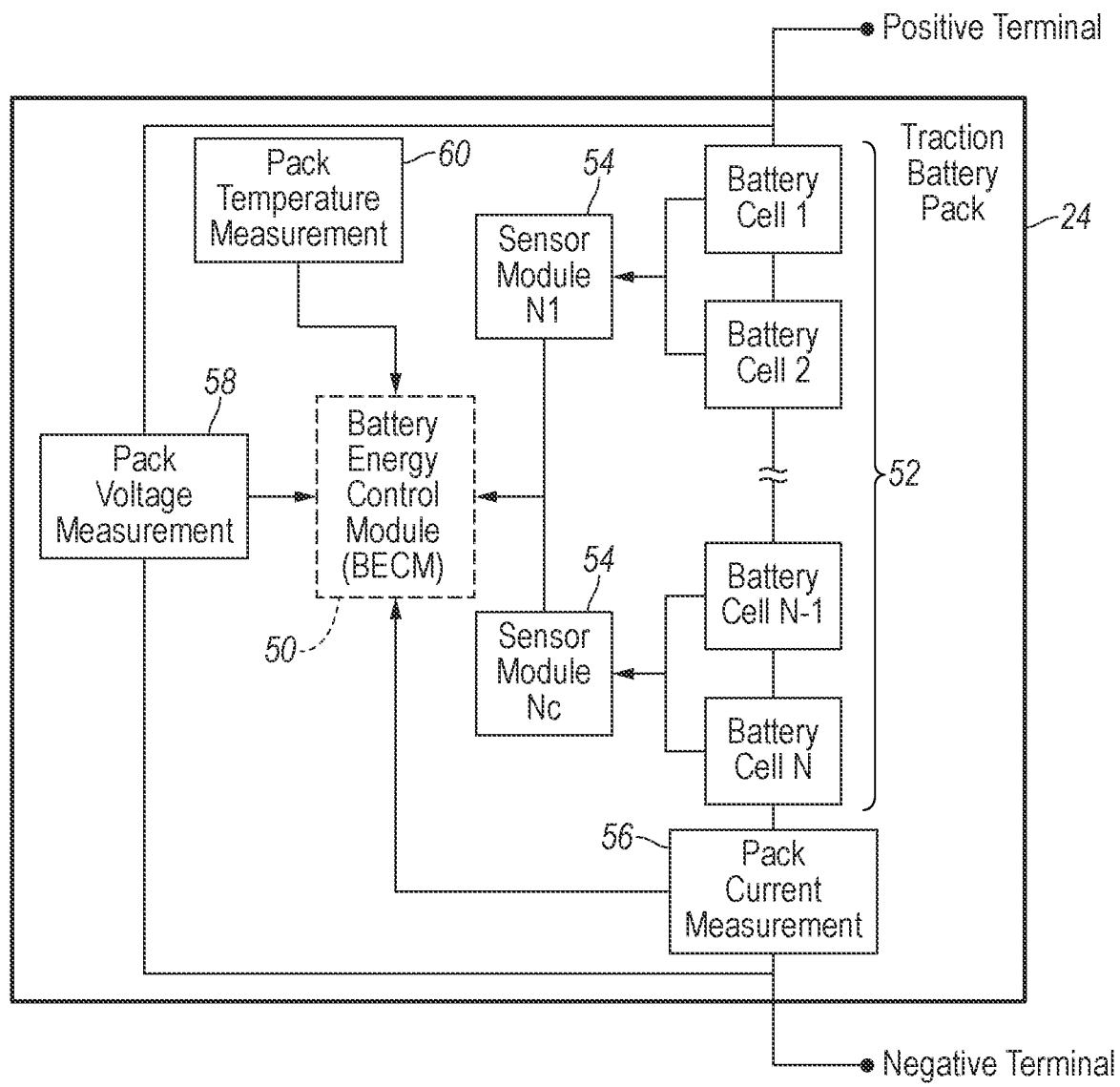
FIG. 2 illustrates a block diagram of an arrangement for a traction battery controller of the BEV to monitor a traction battery of the BEV.

Referring now to FIG. 2, with continual reference to FIG. 1, a block diagram of an arrangement for BECM 50 to monitor traction battery 24 is shown. Traction battery 24 is comprised of a plurality of battery cells 52. Battery cells 52 are physically connected together (e.g., connected in series as shown in FIG. 2).

BECM 50 is operable to monitor pack level characteristics of traction battery 24 such as battery current 56, battery voltage 58, and battery temperature 60. Battery current 56 is the current outputted (i.e., discharged) from or inputted (i.e., charged) to traction battery 24. Battery voltage 58 is the terminal voltage of traction battery 24.

BECM 50 is also operable to measure and monitor battery cell level characteristics of battery cells 52 of traction battery 24. For example, terminal voltage, current, and temperature of one or more of battery cells 52 may be measured. BECM 50 may use a battery sensor 54 to measure the battery cell level characteristics. Battery sensor 54 may measure the characteristics of one or multiple battery cells 52. BECM 50 may utilize Nc battery sensors 54 to measure the characteristics of all battery cells 52. Each battery sensor 54 may transfer the measurements to BECM 50 for further processing and coordination. Battery sensor 54 functionality may be incorporated internally to BECM 50.

Traction battery 24 may have one or more temperature sensors such as thermistors in communication with BECM 50 to provide data indicative of the temperature of battery cells 52 of traction battery 24 for the BECM to monitor the temperature of the traction battery and/or the battery cells. BEV 12 may further include a temperature sensor to provide data indicative of ambient temperature for BECM 50 to monitor the ambient temperature.

BECM 50 controls the operation and performance of traction battery 24 based on the monitored traction battery and battery cell level characteristics. For instance, BECM 50 may use the monitored characteristics to measure (e.g., detect or estimate) operating characteristics of traction battery 24 (e.g., the power capability of the traction battery, the SOC of the traction battery, and the like) such as for use in controlling the traction battery and/or BEV 12.

As known by those of ordinary skill in the art, BECM 50 may measure operating characteristics of traction battery by using an observer, whereas a battery model (i.e., "equivalent circuit model" (ECM)) is used for construction of the observer, with measurements of battery current, terminal voltage, and battery temperature. BECM 50 may estimate values of parameters of the ECM (e.g., resistances and capacitances of circuit elements of the ECM) and values of states of the ECM (e.g., voltages and currents across circuit elements of the ECM) through recursive estimation based on such measurements. For instance, BECM 50 may use some adaptive estimation method, such as extended Kalman filter (EKF), to estimate the values of the model parameters and model states.

Figure 3:
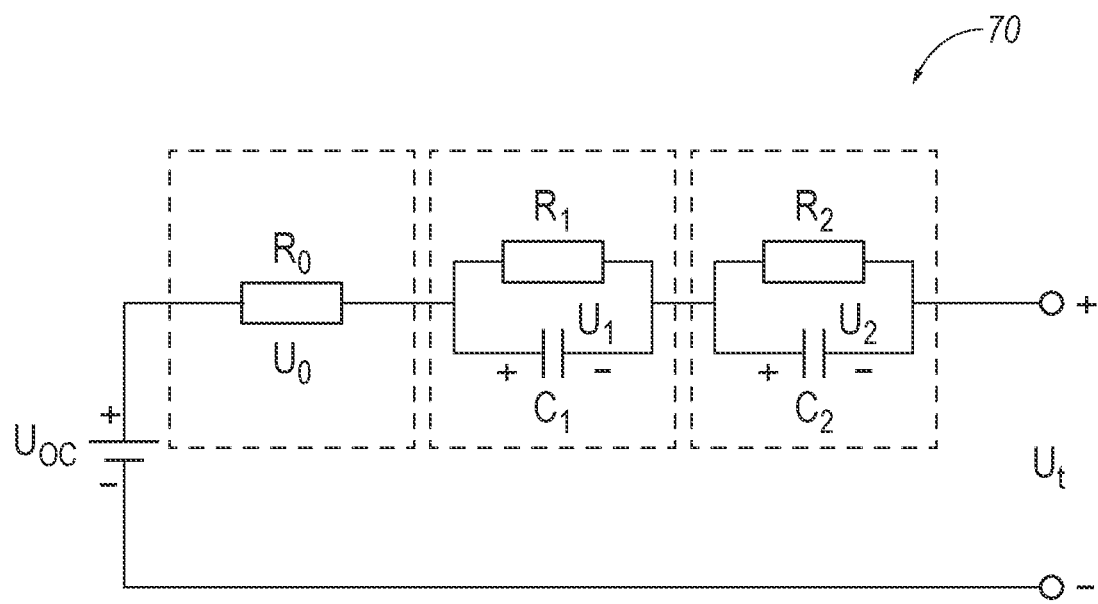
FIG. 3 illustrates a schematic diagram of a second-order equivalent circuit model of the traction battery.

In further detail, FIG. 3 illustrates a schematic diagram of a second-order ECM 70 of traction battery 24. ECM 70 and the EKF implementation will be used to describe the traction battery estimation processes carried out by BECM 50.

A state space equation for ECM 70 can be written as follows. The states (assuming the parameters are known):

$$\begin{bmatrix} \dfrac{dSOC(t)}{dt} \\ \dfrac{dU_1(t)}{dt} \\ \dfrac{dU_2(t)}{dt} \end{bmatrix} = \begin{bmatrix} \dfrac{-I(t)}{Q} \\ \dfrac{1}{C_1}I(t) - \dfrac{1}{R_1 C_1}U_1(t) \\ \dfrac{1}{C_2}I(t) - \dfrac{1}{R_2 C_2}U_2(t) \end{bmatrix} + \omega(t)$$

Here, Q is the capacity of traction battery 24 and $\omega(t)$ is the "state noise" vector.

The output voltage (assuming the "Open Circuit Voltage" (OCV) depends only on the SOC of traction battery 24):

$$U_t(t) = f(SOC) - R_0 * I(t) - U_1(t) - U_2(t) + v(t)$$

Here, $v(t)$ is the output measurement noise.

A discretized version of the above equations, with a time step $T_s$:

$$\begin{bmatrix} SOC((k+1)T_s) \\ U_1((k+1)T_s) \\ U_2((k+1)T_s) \end{bmatrix} = \begin{bmatrix} SOC(kT_s) - T_s \dfrac{I(kT_s)}{Q} \\ \left(1 - \dfrac{T_s}{R_1 C_1}\right) U_1(kT_s) + \dfrac{T_s}{C_1} I(kT_s) \\ \left(1 - \dfrac{T_s}{R_2 C_2}\right) U_2(kT_s) + \dfrac{T_s}{C_2} I(kT_s) \end{bmatrix} + \omega(kT_s)$$

$$U_t(kT_s) = f(SOC(kT_s)) - R_0 * I(kT_s) - U_1(kT_s) - U_2(kT_s) + v(kT_s)$$

The EKF can be used to estimate the battery states (SOC, $U_0$, $U_1$, $U_2$, $U_{OC}$) and battery model parameters ($R_0$, $R_1$, $R_2$ and $C_1$, $C_2$).

For an EKF used for estimating the states only, it is known that the SOC and the voltages $U_1$ and $U_2$ are set as EKF states, and the standard EKF techniques can be used to estimate the states. The pre-requisite is that all the other parameters such as $R_0$, $R_1$, $R_2$ and $C_1$, $C_2$ in the ECM are known in advance. For the sake of simplicity, the parameters and the battery capacity are considered known yet with uncertainties. Charge efficiency is assumed to be one, so that factor is not listed in the equations. For each time step, the input to the traction battery (current) and outputs from the traction battery (voltage, temperature) are used to determine the model parameters and states.

On the other hand, for an EKF used for state and parameter estimation, an EKF with a much larger number of states is built. For example, in addition to SOC, $U_1$, and $U_2$, parameters such as $R_0$, $R_1$, $C_1$, $R_2$, $C_2$, and even battery capacity (Q), can be added as state variables. Again, the standard EKF can be used to estimate the state vectors (both the SOC, $U_1$, $U_2$ and all the other parameters).

Figure 4:
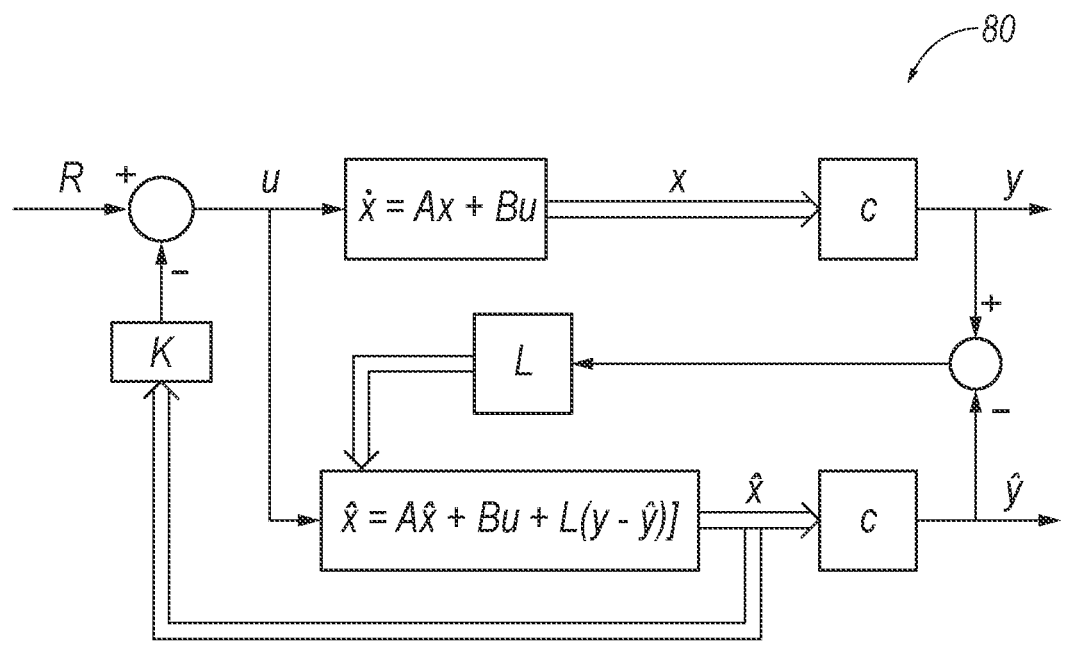
FIG. 4 illustrates a block diagram of a linear observer with gain matrix.

In further detail, FIG. 4 illustrates a block diagram 80 of a linear observer with gain matrix. Using this simple linear observer setting, it can be determined that the estimation errors can be linked to the estimator gain (the L matrix) and the projection error (y-y).

The gain L plays two roles, among other things (such as guaranteeing closed loop system stability). First, the gain L determines the speed of the estimation (i.e., how fast is the estimation). Basically, a larger value of the estimator gain (assuming a single variable) produces faster estimation convergence, but the error (for example, current measurement error, resistance value error) will be amplified more. On the other hand, a smaller value estimator gain produces slower estimation convergence, but the error in input/output measurements and parameters will be less amplified as compared with a larger gain. Second, when there are parameter uncertainties among the various parameter matrices A, B, C and input R, the gain L normally amplifies the error and passes it to both state and output estimation error. The larger the gain, the larger the estimation errors can be. The same can be said about the EKF.

Figure 5:
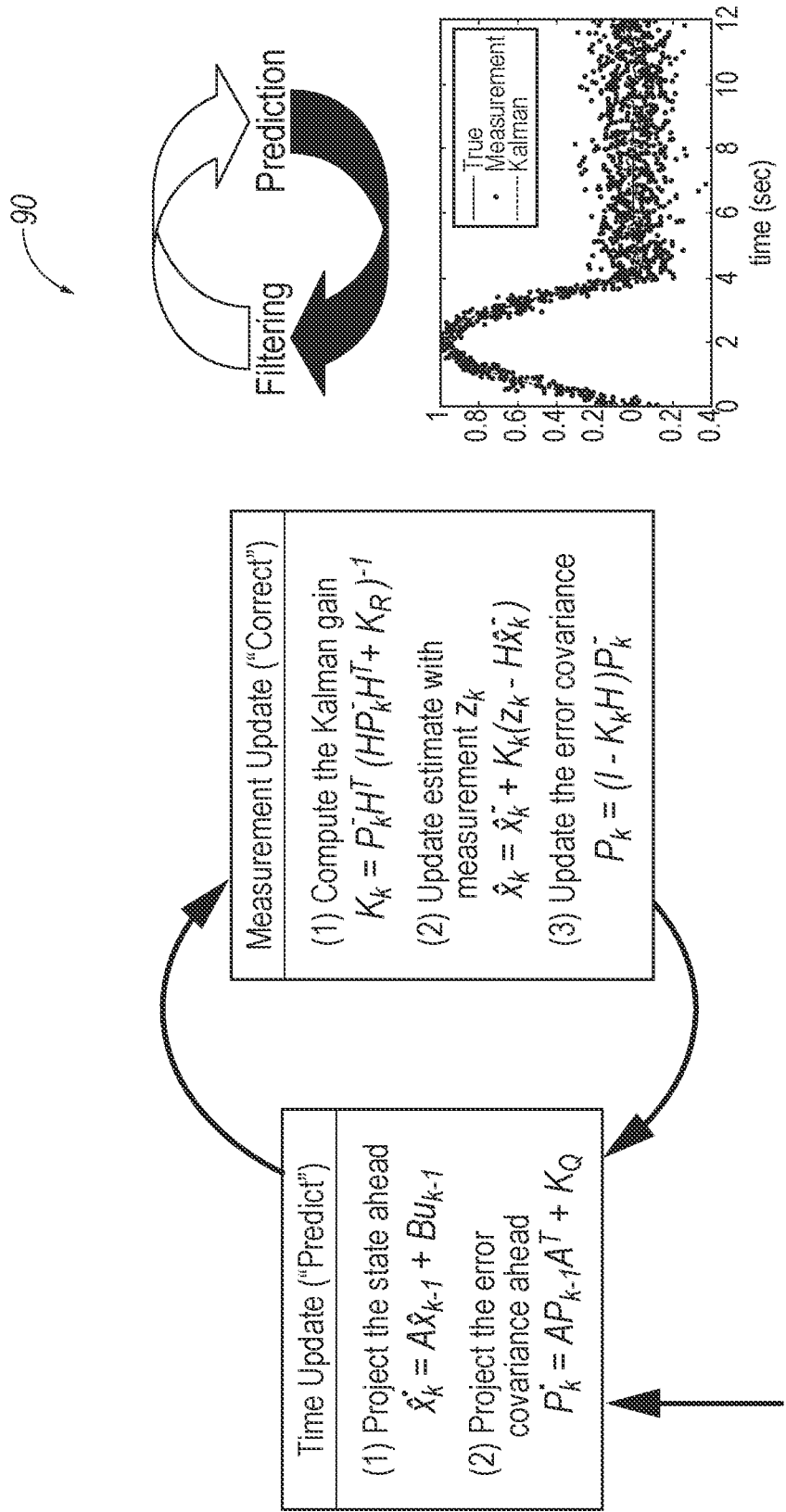
FIG. 5 illustrates a drawing depictive of a configuration of an extended Kalman filter (EKF)

In further detail, FIG. 5 illustrates a drawing 90 depictive of an EKF configuration 90. The A, B, and H matrices are from the state space equations (related Jacobi matrices). The P and K matrices are for the state and measurement noise covariance matrices, and associated estimator gain choices. Here, a state is first predicted, and then updated by adding the projection error with a gain $K_K$.

The gain $K_K$ is the gain of the EKF (i.e., "the EKF gain"). The EKF gain is obtained through a series of matrix manipulations involving $K_R$ (the measurement noise covariance matrix) and $K_Q$ (the process noise covariance matrix). In this regard, the EKF gain is generally inversely proportional to the gain factor $K_R$ (i.e., "the gain factor"). Thus, the EKF gain decreases as the gain factor increases; and the EKF gain increases as the gain factor decreases. Accordingly, if under certain operating conditions a larger EKF gain is preferred, then a smaller gain factor is chosen. On the other hand, if under different operating conditions a smaller EKF gain is preferred, then a larger gain factor is chosen.

As indicated above, a large EKF gain (i.e., a large feedback gain) normally leads to under damped responses (faster response and larger oscillations of the controlled variables), and potentially unstable, closed loop system. On the other hand, a small EKF gain (i.e., a small feedback gain) normally leads to over damped responses (slower response). Therefore, an improper EKF gain may either lead to large oscillation, or slow learning, of the learned ECM parameters in terms of estimation accuracy (bias) or learning speed.

An issue in implementing a model-based estimator for traction battery 24 is that when the SOC of the traction battery is very low (e.g., SOC<10%), the estimator (i.e., the EKF) tends to oscillate thus leading to unsatisfactory traction battery operating characteristics calculations (e.g., unsatisfactory calculation of the power capability of the traction battery). As such, subsequent vehicle control actions for protecting traction battery 24 may lead to unsatisfactory performance such as loss of power suddenly due to power capability sudden drop because of over discharge. Similarly, the EKF tends to oscillate when the SOC of traction battery 24 is very high (e.g., SOC>90%).

In accordance with the present disclosure, BECM 50 adjusts the estimator gain (e.g., the EKF gain) depending on the SOC of traction battery 24. That is, BECM 50 implements a SOC-dependent estimator gain calibration (i.e., a SOC-dependent EKF gain calibration). Particularly, in the example herein, BECM 50 reduces the estimator gain depending on the SOC of traction battery 24 when the SOC is within a low charge region (e.g., SOC<10%) and when the SOC is within a high charge region (e.g., SOC>90%). In this way, an idea employed by BECM 50 when traction battery 24 is operating in such low and high charge regions is to try to slow down the estimator by lowering the estimator gain so that the estimations do not overshoot (in terms of power capability, this means no over discharge at low SOC and no over charge at high SOC).

In operation, when traction battery 24 discharges such that the SOC becomes lower than a predetermined low charge region threshold (e.g., when the traction battery discharges such that the SOC of the traction battery becomes lower than 10%), BECM 50 reduces the estimator gain. Likewise, when traction battery 24 charges such that the SOC becomes greater than a predetermined high charge region threshold (e.g., when the traction battery charges such that the SOC of the traction battery becomes greater than 90%), BECM 50 reduces the estimator gain. Consequently, due to the reduced estimator gain, the adaptation speed of the estimator (i.e., the EKF adaptation or convergence speed) is reduced while traction battery 24 has either a low SOC (SOC<10%) or a high SOC (SOC>90%).

More particularly, in the example herein, BECM 50 reduces the estimator gain as the SOC falls while the SOC is below the low charge region threshold (e.g., SOC≤10% and the SOC is falling) or as the SOC rises while the SOC is above the high charge region threshold (e.g., SOC≥90% and the SOC is rising). For example, BECM 50 reduces the estimator gain by (i) a factor of 1x when the SOC of traction battery 24 is 10%, (ii) a factor of 2x when the SOC is 5%, and (iii) a factor of 3x when the SOC is 2%. Likewise, for example, BECM 50 reduces the estimator gain by (i) a factor of 1x when the SOC of traction battery 24 is 90%, (ii) a factor of 2x when the SOC is 95%, and (iii) a factor of 3x when the SOC is 98%. The intention is for BECM 50 to match the EKF adaptation speed with SOC dependent dynamics of traction battery 24. (The factor "x" and the symmetry is just an example—the actual estimator gain reduction values are chosen, such as from predetermined data, so that the EKF adaptation speed matches the SOC dependent dynamics of traction battery 24.)

Further particularly, in the example herein, BECM 50 does not adjust the estimator gain when the SOC is above the low charge region threshold and below the high charge region threshold (e.g., 10%<SOC<90%). In such "normal" operating SOC conditions (i.e., SOC not too low and SOC not too high), BECM 50 uses a fixed estimator gain.

As an overview, dynamics of traction battery 24 change with SOC (and also change with temperature of the traction battery). With a reduced estimator gain, it is possible that the overall system does not "overshoot" in detecting operating characteristics of traction battery 24 such as in detecting the power capability of the traction battery. It is also desirable to adjust the estimator gain as battery cell dynamics change with SOC. That is, battery dynamics change with SOC so there is a need to adjust the estimator gain at different SOCs. Particularly, at low SOC (i.e., close to fully depleted) and at high SOC (i.e., close to fully charged) it is desirable to circumvent overshooting in power capability estimation. For instance, over estimation of battery discharge power capability at low SOC may lead to battery power capability violation, potentially leading to other protection mechanisms to take over, or, even at times, under/over voltage situations.

By reducing the estimator gain at low SOC and at high SOC, BECM 50 matches the EKF adaptation speed with the SOC dependent dynamics of traction battery 24. Otherwise, with improper EKF calibration, once the SOC reaches a low SOC (e.g., SOC<10%), discharge activity may lead to discharge of traction battery 24 beyond its power capability seen as undervoltage or low voltage limit violation. The same can be said about charge activity at high SOC (e.g., SOC>90%) with improper EKF calibration.

As described, by adjusting the estimator gain dependent on the SOC of traction battery 24, BECM 50 is operable to accurately estimate the power capability of the traction battery at low/high SOC. BECM 50 adjusts the estimator gain at different SOCs to circumvent overshooting in power capability estimation. Particularly, BECM 50 circumvents overcharging traction battery 24 (SOC>90%) and circumvents discharging the traction battery (SOC<10%) by lowering the estimator gain using an EKF (by calibration state and output covariance matrices $K_R$ and $K_Q$, for the sake of utilizing prediction and actual voltage error for feedback correction). In sum, BECM 50 reduces EKF adaptation speed when the battery state reaches either of the SOC end regions.

Further, in conjunction with adjusting the estimator gain depending on the SOC of traction battery 24, BECM 50 may adjust the estimator gain depending further on the temperature of the traction battery. That is, BECM 50 may implement a SOC and temperature dependent estimator gain calibration (i.e., a SOC and temperature dependent EKF gain calibration). Particularly, in the example herein, BECM 50 reduces the estimator gain as the temperature of traction battery 24 falls while the temperature is below a threshold temperature threshold (e.g., temperature≤10° C. and the temperature is falling). For example, BECM 50 reduces the estimator gain by (i) a factor of 1y when the temperature of traction battery 24 is 0° C., (ii) a factor of 2y when the temperature of the traction battery is -10° C., and (iii) a factor of 3y when the temperature of the traction battery is -20° C. Again, these are examples—the actual estimator gain reduction values are chosen so that the EKF adaptation speed matches the temperature dependent dynamics of the traction battery in further consideration with the SOC dependent dynamics of the traction battery.

In order to adjust the estimator gain (e.g., EKF gain $K_K$) of an estimator (e.g., the EKF) to a desired value, BECM 50 may select an appropriate gain factor (e.g., gain factor $K_R$) for the EKF to use in order for the estimator gain to be set at the desired value. Recall that a smaller gain factor corresponds to a larger estimator gain and that a larger gain factor corresponds to a smaller estimator gain. In variations, BECM 50 may further select an appropriate corresponding gain factor (e.g., gain factor $K_Q$) so that the estimator gain has the desired value. In such variations, the two matrices $K_R$ and $K_Q$ provide for the determination of the EKF gain.

Figure 6:
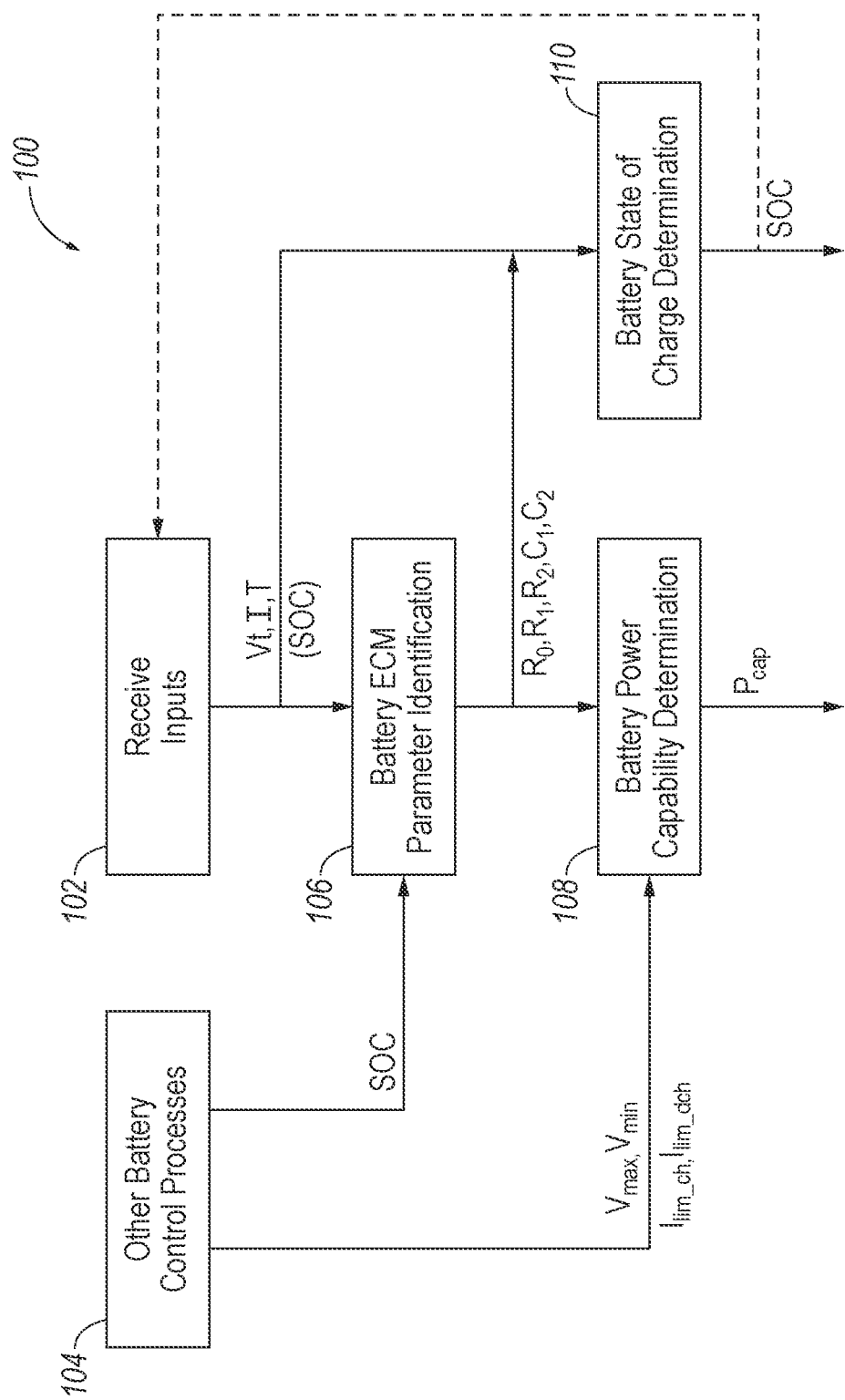
FIG. 6 illustrates a block diagram describing operation carried out by the traction battery controller for detecting the power capability of the traction battery and/or the state-of-charge (SOC) of the traction battery according to an EKF gain depending at least on the SOC of the traction battery and further possibly on the temperature of the traction battery.

Referring now to FIG. 6, a block diagram 100 describing operation carried out by BECM 50 for detecting the power capability of traction battery 24 and/or the SOC of the traction battery according to an EKF gain depending at least on the SOC of the traction battery and further possibly on the temperature of the traction battery is shown.

In process block 102, BECM 50 receives input that is indicative of traction battery voltage (Vt), traction battery current (I), and traction battery temperature (T). The input is measured by sensors as described above. The input may further include a previously estimated SOC, as represented by a dashed line in flow chart 100.

In process block 104, BECM 50 determines battery control parameters, such as the SOC and battery voltage and current limits ($V_{max}$, $V_{min}$, $I_{lim\_ch}$, $I_{lim\_dch}$). BECM 50 may calculate the SOC using the ampere-hour-integration method.

In process block 106, BECM 50 estimates ECM battery parameters (e.g., $R_0$, $R_1$, $R_2$, $C_1$, $C_2$) using a recursive parameter estimation algorithm with the EKF. As described above, the EKF has as EKF gain that the EKF implements in the recursive parameter estimation algorithm. The EKF uses the measured voltage, current, and temperature of traction battery 24 in the recursive parameter estimation algorithm for estimating the ECM battery parameters. The SOC, which may be provided by process blocks 102 or 104, may also be used in estimating the ECM battery parameters.

Further in process block 106, BECM 50 selects an appropriate gain factor depending on the SOC of traction battery 24 so that the EKF has an EKF gain suitable for the SOC of the traction battery. Particularly, as described above, BECM 50 selects a gain factor so that the EKF has a reduced EKF gain when the traction battery has either a low SOC or a high SOC.

BECM 50 may also select the appropriate gain factor further depending on the temperature of traction battery 24 so that the EKF gain is suitable for the SOC and the temperature of the traction battery. Particularly, as described above, BECM 50 selects the gain factor so that the EKF has a reduced EKF gain for colder temperatures of the traction battery.

In process block 108, BECM 50 estimates the power capability (Pcap) of traction battery 24. With knowledge of the estimated ECM battery parameters, BECM 50 utilizes known equations for estimating the charging and discharging battery power capability, respectively. BECM 50 controls traction battery 24 and/or BEV 12 according to the estimated power capability of the traction battery.

In process block 110, BECM 50 estimates the SOC of traction battery 24. Likewise, with knowledge of the estimated ECM battery parameters, BECM 50 utilizes known equations for estimating the SOC. BECM 50 controls traction battery 24 and/or BEV 12 according to the estimated SOC of the traction battery.

As described, in accordance with the present disclosure, a traction battery controller of an electrified vehicle employs a SOC and temperature dependent estimator gain calibration for power and SOC estimation of a traction battery. In this way, the controller employs a model-based power and SOC estimation strategy in which the estimation gain is dynamically selected based on the SOC and the temperature of the traction battery.

While exemplary embodiments are described above, it is not intended that these embodiments describe all possible forms of the present disclosure. Rather, the words used in the specification are words of description rather than limitation, and it is understood that various changes may be made without departing from the spirit and scope of the present disclosure. Additionally, the features of various implementing embodiments may be combined to form further embodiments of the present disclosure.

What is claimed is:

1. A vehicle comprising:
a traction battery; and
a controller configured to dynamically adjust an estimation gain based on a state-of-charge (SOC) of the traction battery and to control the vehicle according to an operating characteristic of the traction battery estimated from an equivalent circuit model of the traction battery that depends on the estimation gain; and
wherein the controller reduces the estimation gain when the SOC is less than a low charge threshold, maintains the estimation gain when the SOC is between the low charge threshold and a high charge threshold, and reduces the estimation gain when the SOC is greater than the high charge threshold.

2. The vehicle of claim 1 wherein:
the controller reduces the estimation gain at an increased rate as the SOC decreases while the SOC is less than the low charge threshold.

3. The vehicle of claim 2 wherein:
the controller reduces the estimation gain at an increased rate as the SOC increases while the SOC is greater than the high charge threshold.

4. The vehicle of claim 1 wherein:
the controller is further configured to dynamically adjust the estimation gain based further on a temperature of the traction battery.

5. The vehicle of claim 4 wherein:
the controller reduces the estimation gain when the temperature is colder than a temperature threshold.

6. The vehicle of claim 5 wherein:
the controller reduces the estimation gain at an increased rate as the temperature decreases while the temperature is colder than the temperature threshold.

7. The vehicle of claim 1 wherein:
the operating characteristic of the traction battery is a power capability of the traction battery.

8. The vehicle of claim 1 wherein:
the operating characteristic of the traction battery is an updated SOC of the traction battery.

9. A method for a vehicle having a traction battery, the method comprising:
dynamically adjusting, by a controller, an estimation gain based on a state-of-charge (SOC) of the traction battery; and
controlling, by the controller, the vehicle according to an operating characteristic of the traction battery estimated from an equivalent circuit model of the traction battery that depends on the estimation gain; and
wherein dynamically adjusting the estimation gain based on the SOC includes reducing the estimation gain when the SOC is less than a low charge threshold, maintaining the estimation gain when the SOC is between the low charge threshold and a high charge threshold, and reducing the estimation gain when the SOC is greater than the high charge threshold.

10. The method of claim 9 further comprising:
dynamically adjusting the estimation gain based further on a temperature of the traction battery.

11. A system for a vehicle having a traction battery, the system comprising:
a controller configured to dynamically adjust an estimation gain based on a state-of-charge (SOC) of the traction battery and to control the vehicle according to an operating characteristic of the traction battery estimated from an equivalent circuit model of the traction battery that depends on the estimation gain; and
wherein the controller reduces the estimation gain when the SOC is less than a low charge threshold, maintains the estimation gain when the SOC is between the low charge threshold and a high charge threshold, and reduces the estimation gain when the SOC is greater than the high charge threshold.

12. The system of claim 11 wherein:
the controller is further configured to dynamically adjust the estimation gain based further on a temperature of the traction battery.

13. The system of claim 11 wherein:
the operating characteristic of the traction battery is a power capability of the traction battery.

14. The system of claim 11 wherein:
the operating characteristic of the traction battery is an updated SOC of the traction battery.

15. The system of claim 11 wherein:
the controller reduces the estimation gain at an increased rate as the SOC decreases while the SOC is less than the low charge threshold.

16. The system of claim 11 wherein:
the controller reduces the estimation gain at an increased rate as the SOC increases while the SOC is greater than the high charge threshold.

* * * * *